(12) United States Patent
Le Vacon

(10) Patent No.: US 8,763,228 B2
(45) Date of Patent: Jul. 1, 2014

(54) RING INSERTION AND CRIMPING DEVICE FOR AN ATTACHMENT COMPRISING A ROD HAVING A RING CRIMPED THEREON

(75) Inventor: Philippe Le Vacon, Choiseul (FR)

(73) Assignee: European Aeronautic Defence And Space Company EADS France, Paris (FR)

( * ) Notice: Subject to any disclaimer, the term of this patent is extended or adjusted under 35 U.S.C. 154(b) by 1278 days.

(21) Appl. No.: 12/593,768
(22) PCT Filed: Mar. 26, 2008
(86) PCT No.: PCT/FR2008/050518
§ 371 (c)(1),
(2), (4) Date: Feb. 28, 2010
(87) PCT Pub. No.: WO2008/132407
PCT Pub. Date: Nov. 6, 2008

(65) Prior Publication Data
US 2010/0180424 A1 Jul. 22, 2010

(30) Foreign Application Priority Data
Mar. 30, 2007 (FR) ..................................... 07 54150

(51) Int. Cl.
B23Q 7/04 (2006.01)
(52) U.S. Cl.
USPC ................ 29/283.5; 29/505; 29/509; 29/515; 29/700; 29/709; 29/243.53; 29/437; 29/712; 29/718; 901/16; 901/47
(58) Field of Classification Search
USPC ........ 29/505, 283.5, 509, 515, 592, 428, 437, 29/700, 709, 712, 718, 243.53, 244; 901/16, 47
See application file for complete search history.

(56) References Cited

U.S. PATENT DOCUMENTS 2,531,048 A 11/1950 Huck
(Continued)

FOREIGN PATENT DOCUMENTS

| EP | 0 159 269 | 10/1985 |
| EP | 1 561 526 | 8/2005 |
| JP | H05200638 | 8/1993 |

OTHER PUBLICATIONS

International Search Report dated Oct. 23, 2008.
(Continued)

*Primary Examiner* — Peter DungBa Vo
*Assistant Examiner* — Azm Parvez
(74) *Attorney, Agent, or Firm* — RatnerPrestia

(57) ABSTRACT

The invention relates to a device for inserting and crimping a ring on an attachment rod in a hole, comprising a robot, a monitoring and control system and an end tool designed to crimp the ring on the rod. The end tool includes a crimping device and a ring installation device which are solidly connected to a fine-positioning device, by means of which the end tool is attached to an end element of the robot. A ring insertion subassembly of the ring installation device and a crimping nose of the crimping device can move on the end tool so as to be positioned alternatively on an axis of an attachment to be installed, with no controlled movement of the robot when the end tool has been pre-positioned.

8 Claims, 3 Drawing Sheets

(56) References Cited

U.S. PATENT DOCUMENTS

| | | | | |
|---|---|---|---|---|
| 4,854,491 | A | * | 8/1989 | Stoewer .......................... 227/58 |
| 6,253,448 | B1 | | 7/2001 | Zieve et al. |
| 7,954,218 | B2 | * | 6/2011 | Tomchick et al. ........... 29/243.5 |
| 2008/0155807 | A1 | * | 7/2008 | Toh et al. ................... 29/525.01 |

OTHER PUBLICATIONS

Written Opinion of the International Searching Authority for International Application No. PCT/FR2008/050518; Mailed Dec. 17, 2009 (With English Language Translation).

* cited by examiner

RING INSERTION AND CRIMPING DEVICE FOR AN ATTACHMENT COMPRISING A ROD HAVING A RING CRIMPED THEREON

This application claims priority of PCT International Application No. PCT/FR2008/050518 filed on Mar. 26, 2008. The contents of which are incorporated herein by reference.

FIELD OF THE INVENTION

The invention relates to the field of attachments comprising a rod on which a ring is crimped to ensure the attachment is maintained. More specifically, the invention relates to a device for automatically installing the ring and crimping it.

BACKGROUND

In high-quality assemblies subjected to considerable stress for extended periods, for example aircraft structure assemblies, methods have been known for a relatively long time for using attachments in two parts comprising a rod on which a ring is crimped.

One example of such an attachment is depicted in FIG. 1 installed to allow the assembly, for example, of two panels 16 and 17.

The attachment 1 comprises, on the one hand, a substantially cylindrical rod 11 with a longitudinal axis 10 ending in a head 12 at one end. At the end of the rod 11 opposite the head 12 the rod comprises a series of grooves 13 along part of its length. The overall length of the rod is selected according to the thickness of the assembled panels so that, when the rod is in place in an attachment hole passing through the two panels and the head 12 of the rod 11 is resting against one surface of the panel 16 on the side of said head, the length of the rod comprising the grooves 13 sticks out from the panel 17 on the side opposite the head 12.

The attachment 1 comprises, on the other hand, a ring 15 which is resting against the free surface of the panel 17, the material of which adapts to the shape of the grooves 13 so that the attachment firmly holds the two panels 16 and 17 together due to the pull exerted on the rod 11 between the head 12 and the ring 15.

Such an attachment is described, for example, in U.S. Pat. No. 2,531,048.

The usual way of installing this type of attachment involves a tool that first exerts a pull on the rod 11, for example by means of an extension 18 of the rod on the side of the end opposite the head 12, taking support on the free surface of the panel 17 next to the attachment 1, and then crimps the ring 15 previously slipped onto the rod 11, radially compressing said ring, made from a ductile material, on the grooves 13 so that the material of the ring adapts to the shapes of the grooves.

In a third instance, the pull on the rod 11 is released and the tool is removed. In most cases, this step includes breaking the extension 18 of the rod at a calibrated breakage area 19, said extension having no further utility when the attachment is in place.

As can be seen from the description of this process, the installation of an attachment therefore requires several consecutive operations.

When the hole in which the attachment is to be installed is made, it is necessary to:
- place the rod 11 in the hole via one surface of the assembly;
- slide the ring 15 onto the rod on the side of the other surface of the assembly;
- position the crimping tool;
- crimp the ring 15 by exerting a pull on the extension 18 of the rod 11;
- remove the tool.

When this sequence must be performed many times, several hundred or several thousand times, for example during the assembly of complex structures such as aircraft structures, any reduction of the time required for each installation cycle becomes particularly important for reducing assembly times and inherent costs.

Evidently, the time required for each attachment installation cycle, which is to say, positioning the tools and installing the actual attachment, can only be reduced to the detriment of the quality of the assemblies.

SUMMARY OF THE INVENTION

The invention provides an efficient device for installing a crimping ring and crimping said ring automatically using a robot carrying an end tool.

The device for inserting and crimping a ring on a rod of an attachment previously inserted in a hole comprises a robot, a monitoring and control system and an end tool. The end tool, in turn, comprises a crimping device and a ring installation device, which are solidly connected to a fine-positioning device by means of which the end tool is attached to an end element of the robot.

In order to perform the crimping in the smallest number of actions, at least one ring insertion subassembly of the ring installation device and a crimping nose of the crimping device can move on the end tool so as to be positioned alternatively on an axis of an attachment to be installed. This alternative positioning of the insertion subassembly or the crimping nose is carried out with no controlled movement of the robot when the end tool has been prepositioned.

Preferably, in order to perform the change between the insertion subassembly and the crimping nose in a continuous movement, the relative position between an outlet axis of a ring transport channel for the insertion subassembly and an axis of the crimping nose, said axes being substantially parallel to the axis of the rod of the attachment when the end tool is in position to install and crimp a ring, is substantially constant.

The fine-positioning device advantageously comprises a motorised translation table with three axes X, Y and Z substantially perpendicular to one another, the Z axis being positioned substantially parallel to the axis of the crimping nose, and said fine-positioning device is capable of being positioned alternatively on the axis of an attachment for installing, on the one hand, the ring insertion subassembly of the ring installation device and, on the other hand, the crimping nose of the crimping device by a single movement according to the X and/or Y axes of the fine-positioning device with no controlled movement of the robot.

To compensate for positioning errors of the end tool associated with the precision of the robot and the manufacturing tolerances, a repositioning system is used for the ring installation device. This repositioning system measures a deviation between the position of the attachment hole and the axis of the outlet of the ring transport channel and modifies the position of the ring installation device to bring the value of the deviation under a threshold value.

The measured deviation is advantageously reduced by means of actuators causing the fine-positioning device to move according to directions X and Y.

The deviation, for example the deviation between the position of the attachment hole and the axis of the outlet of the ring transport channel, is advantageously measured by means of a camera producing images which are analysed in order to determine said deviation.

The camera preferably provides a picture of the attachment hole in a frame of reference that is fixed in relation to the axis of the outlet of the ring transport channel, for example by observing the hole of the attachment to be installed by means of the camera in line with the axis of the outlet of the ring transport channel.

In one specific embodiment of the invention, which in a more straightforward manner prevents the end tool from being blocked by structural obstacles, in particular due to movements associated with position changes of the ring installation device and the crimping nose, the ring installation device comprises two ring insertion subassemblies arranged substantially symmetrically in relation to the crimping nose, the insertion subassembly used for an attachment then being selected according to the position of the obstacle.

In order for a ring inserted on an attachment rod to be held in place prior to crimping regardless of the orientation of the rod when the ring insertion subassembly is released to allow the positioning of the crimping nose, the device comprises at least one stop which in turn comprises at least one position in which a ring is held on the attachment rod when the ring installation device is removed from the ring insertion position.

To manage situations in which the end tool must be placed in a specific position or must select one ring insertion subassembly instead of the other, the monitoring and control system comprises a database containing the position and orientation in a frame of reference of the attachments to be installed and, for each attachment, information characterising the direction and the distance of the closest structural obstacle to the attachment.

The invention also relates to a method for installing an attachment, the device being particularly well suited for implementing said method.

According to the method, the installation of an attachment including a ring crimped by means of a robot includes the following steps of:
- prepositioning, by a first set of positioning means, a crimping tool comprising a second set of fine-positioning tools, and comprising a crimping nose and at least one ring insertion subassembly solidly connected to the second set of fine-positioning means, in relation to a hole in which the attachment must be installed;
- positioning the ring insertion subassembly in line with an axis provided for the crimping nose by means of the fine-positioning means;
- correcting the position of the insertion subassembly by means of the second fine-positioning means in order to place an axis of said subassembly substantially in line with an axis of the hole in which the attachment must be installed;
- inserting, after placing a rod of the attachment in the hole, the ring on the rod of the attachment by means of the ring insertion subassembly;
- offsetting the crimping nose assembly and the ring insertion subassembly by means of the second fine-positioning means, in order to position an axis of the crimping nose in line with the axis of the ring insertion subassembly;
- crimping the ring on the rod of the attachment by means of the crimping nose.

The crimping ring is advantageously locked in place on the rod of the attachment when the ring insertion subassembly is offset in order to position the crimping nose.

BRIEF DESCRIPTION OF THE DRAWINGS

A detailed description of one embodiment of the invention is provided in relation to the appended figures, which schematically depict.

DETAILED DESCRIPTION

Figure 1:
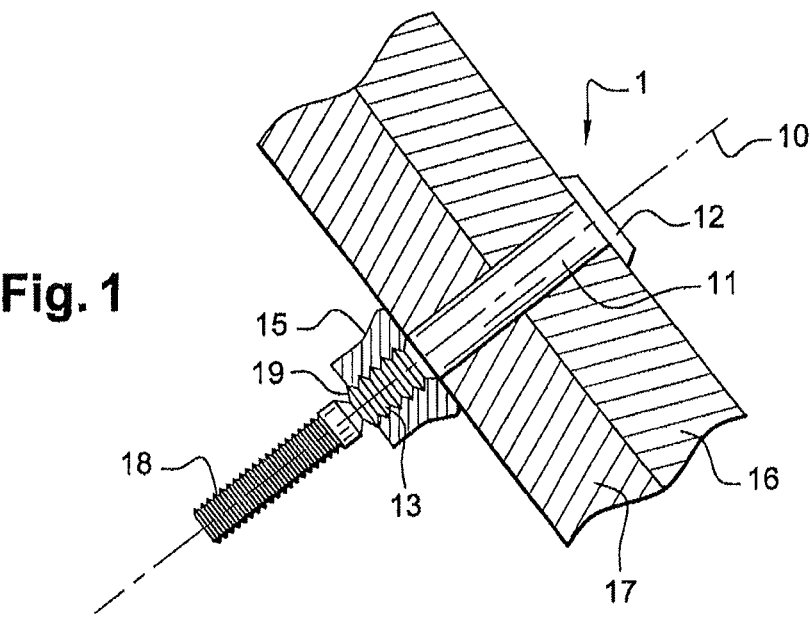
FIG. 1: cited above, a known attachment used in the device according to the invention.
Figure 2:
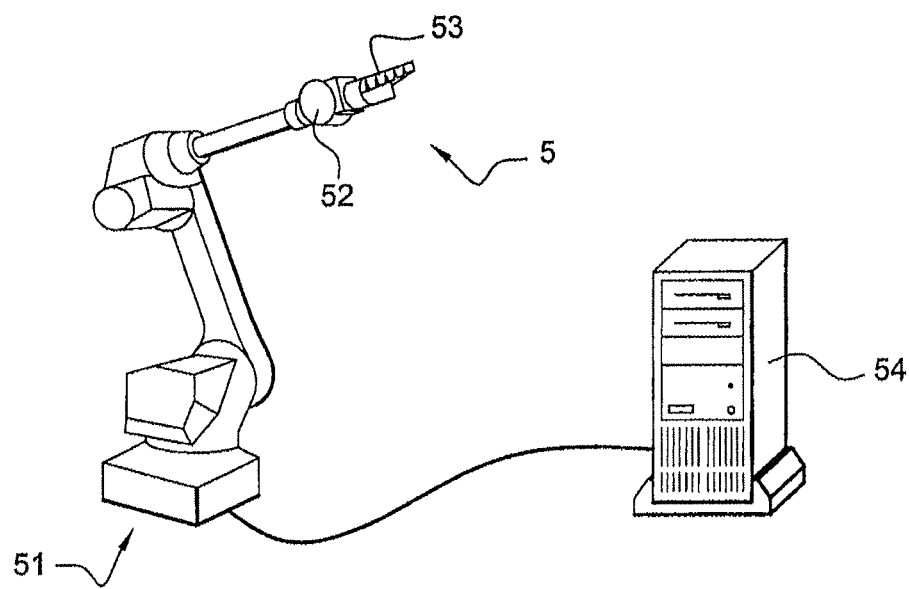
FIG. 2: overview of the device according to the invention.

A device 5 for installing and crimping rings depicted in FIG. 2 comprises, on the one hand, a robot 51 capable of placing and positioning, in at least one given volume of space, one end 52 of an arm carrying an end tool 53 for installing and crimping rings.

The device also includes a monitoring and control system 54 such as a programmable automaton which can be used to control the movements of the robot 51 and the end tool 53.

The robot 51 is preferably an anthropometric robot which can perform many different movements inside a given volume and is therefore capable of being used for various configurations of elements to be assembled. The moving capabilities of the robot 51 are selected according to the shapes and size of the elements to be assembled. Other shapes of robots carrying the end tool are possible, such as, for example, a mobile carrying device on a linear or curved guide system adapted to the shape of the elements to be assembled.

Figure 3A:
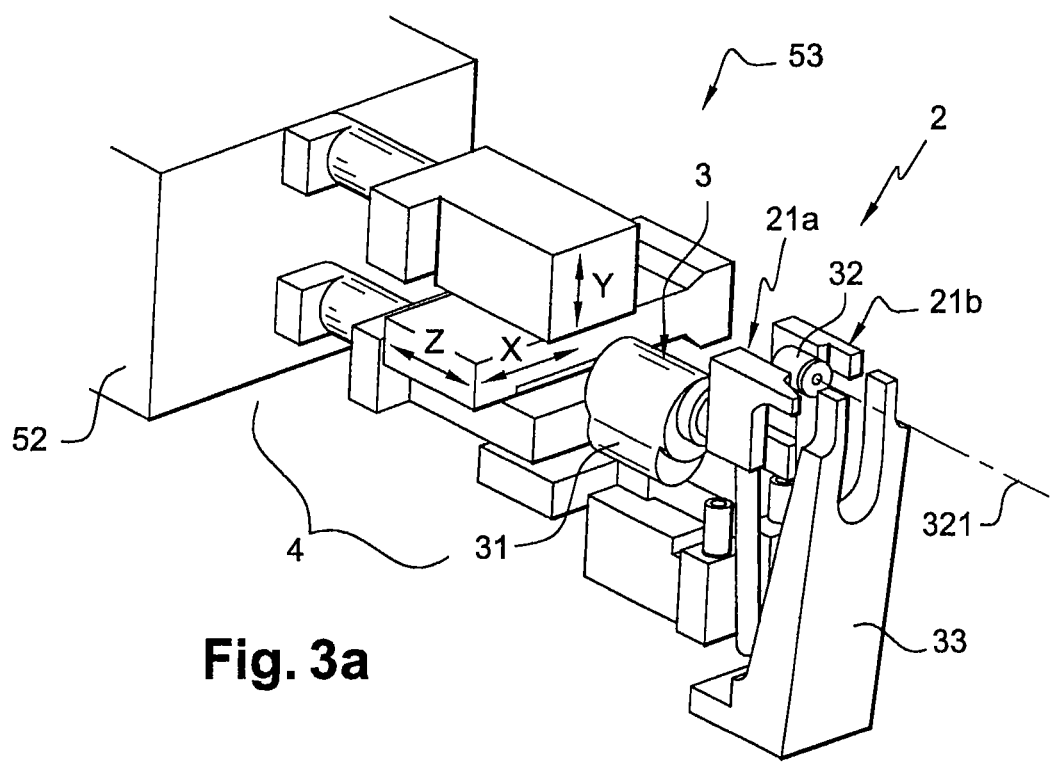
FIG. 3a: an end tool for installing and crimping a ring according to the invention.

The end tool 53 depicted in FIG. 3a consists of three main parts:
1—a fine-positioning device 4;
2—a ring 15 installation device 2;
3—a ring crimping device 3.

The fine-positioning device 4 essentially consists of a motorised translation table according to three main axes, which are substantially perpendicular to one another. The three axes consist of a first axis, called Z, positioned according to an axis 10 of an attachment 1 to be crimped when the end tool 53 is in the position for crimping said attachment 1, and second and third axes called axis Y and axis X, substantially perpendicular to axis Z and substantially perpendicular to one another.

The fine-positioning device 4 is fixed by one of its surfaces to the end 52 of an arm of the carrying robot 51 and supports on another of its surfaces the ring positioning 2 and crimping 3 means, allowing said ring positioning and crimping means to move accurately in relation to the end 52 of the carrying arm according to the three axes X, Y and Z.

Figure 3B:
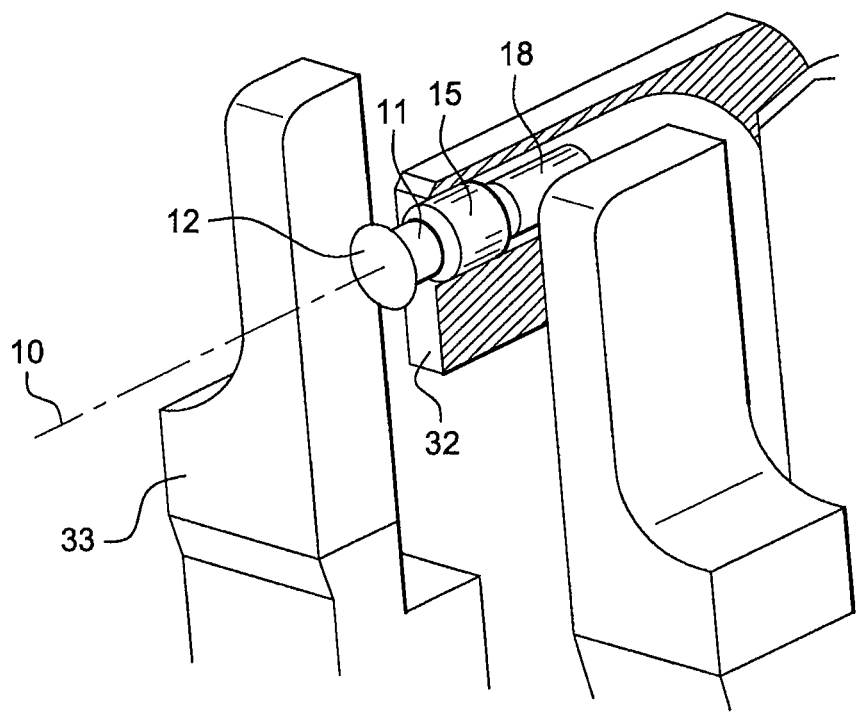
FIG. 3b: detail of an end tool showing the attachment in crimping position; the assembled parts are not shown.
Figure 4:
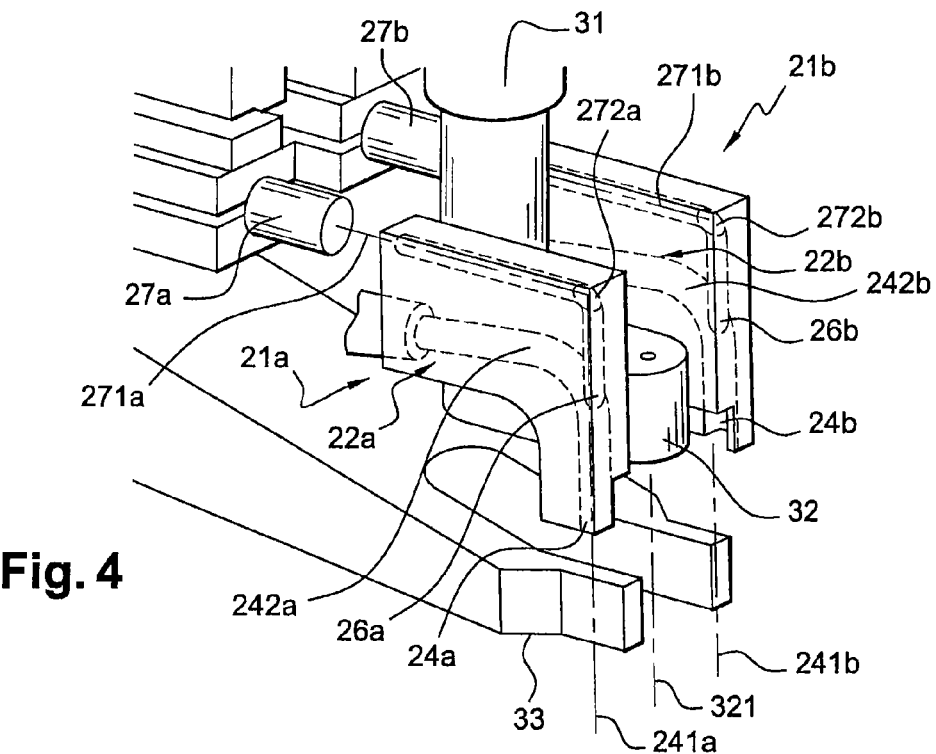
FIG. 4: detail of the end tool in position for installing the crimping ring.

The device 2 for installing the crimping rings 15 comprises, in the embodiment of the invention shown in FIGS. 3a, 3b and 4, two similar rings insertion subassemblies 21a, 21b, each capable of installing rings.

The two subassemblies 21a and 21b are arranged substantially symmetrically on either side of a crimping nose 32 according to the direction corresponding to the movement of the translation table according to the X axis.

The detailed description of a subassembly 21a, 21b is provided for a first subassembly 21a, considering that the second subassembly 21b has a similar constitution in order to perform the same functions.

The first subassembly 21a comprises a channel 22a for receiving rings. The inner diameter of said channel is substantially larger than the outer diameter of the rings to be carried by the channel so that said rings are guided by sliding through the channel and remain coaxial with the channel.

The channel 22a comprises an outlet opening 24a on an axis 241a, positioned substantially parallel to the axis Z and a bend 242a in which an opening 26a is arranged, in the wall of the channel 22a, opening which is in line with the axis 241a.

A camera 27a capable of providing real-time images, for example a video camera, with an optical axis 271a, is arranged on the subassembly 21a so that the optical axis of the camera is in line in the outlet opening area 24a with the axis 241a. The camera 27a then provides an image of the area located in line with the outlet opening 24a, that is, an image of the area in which an attachment must be placed when the end tool 53 is positioned to install a ring 15 on an attachment rod 11.

When the camera 27a is not installed directly on the axis 241a, for example due to its dimensions, an image reflecting device, such as a mirror 272a, allows the camera 27a to be offset as shown in FIG. 4.

According to a similar arrangement, the second subassembly 21b comprises a channel 22b, an opening 24b in said channel according to an axis 241b, a bend 242b in said channel in which an opening 26b is arranged, a camera 27b with optical axis 271b and, when necessary, a reflecting mirror 272b.

In an alternative embodiment of the optical part of the ring crimping device 3, not shown, a single camera is installed, and a switching device, for example a mirror with two positions or a shutter device, is used to position the optical axis of the camera alternating between the two outlet openings 24a, 24b.

The device advantageously also comprises means, not shown, for lighting the area located on the axis of the outlet openings 24a, 24b to obtain images produced by the cameras 27a, 27b with high quality and, essentially, with high contrast.

The channel 22a is furthermore connected, for example by means of a pipe 23a, advantageously a flexible pipe considering the possible movements of the robot 51, to a device for supplying crimping rings. Such a device, not shown, consists for example of a loader or, preferably, a continuous feeding device by means, for example, of a vibrating hopper, the rings being pushed into the pipe 23a and the channel 22a by means of compressed air. The second subassembly 21b is supplied with rings in a similar manner by the same supply device as that used for the first subassembly 21a or else by a second similar supply device.

The crimping device 3 includes the crimping nose 32, an actuator 31 for pulling on said crimping nose and a supporting base plate 33, capable of exerting on the elements to be assembled a force opposing the pulling force on the rod 11 of the attachment during an attachment installation operation, having a fork shape in the opening through which the crimping nose passes during a ring crimping operation.

The pulling actuator 31 and the crimping nose 32 are similar to those used in known ring crimping devices.

The supporting base plate 33 is solidly connected to the end element 52 of the robot 51 so that the position of the crimping nose and the position of the ring positioning device 2 can be modified by means of the fine-positioning device 4 in relation to the supporting base plate.

Furthermore, a stop device is arranged in the supporting base plate 33 next to the outlet openings 24a, 24b when said openings are in position for installing a crimping ring 15.

Figure 5A:
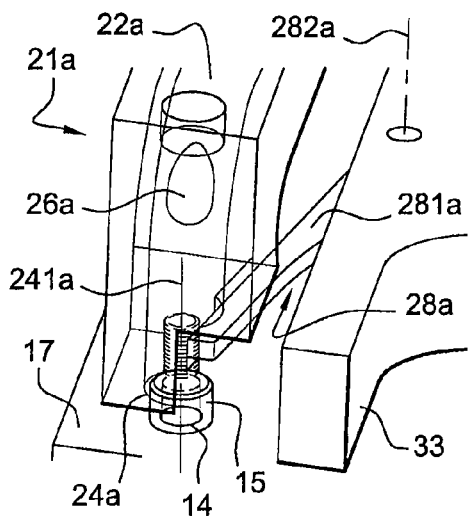
FIGS. 5a and 5b: detail of a device for installing a ring and holding it in position.
Figure 5B:
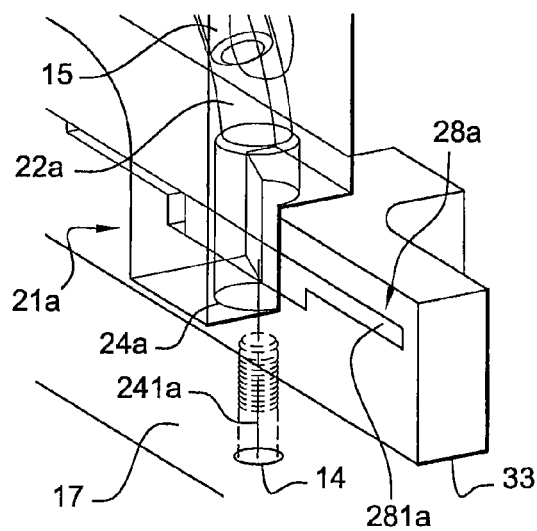

As shown in FIGS. 5a and 5b, on one side of the supporting base plate 33 the stop device 28a comprises for example an arm 281a, moved by an actuator (not shown), which can take up at least two positions, for example by pivoting about a rotation axis 282a.

In a first position shown in FIG. 5b, the arm 281a is in a passing position, lodged in the base plate 33 to free the outlet opening 24a so that a ring 15 arriving via the channel 22a can be inserted freely on the rod of the attachment (shown in dotted lines in FIG. 5), mounted in a bore 14 of a structural element 17, substantially following the axis 241a, until it reaches a point near the structure 14 as shown in FIG. 5a.

In a second position shown in FIG. 5a, the arm 281a is in a blocking position. In this position, the arm 281a is released from the base plate 33, in the direction of the rod of the attachment inserted in the bore 14, so that the arm prevents a ring 15 installed on the rod of the attachment from sliding on the rod, regardless of the orientation of the attachment rod. Thus, the ring 15 is maintained on the rod between the structural element 17 and the arm 281a when the ring insertion subassembly 21a is released to allow the placement of the crimping nose.

As soon as the attachment rod begins to be inserted in the crimping nose (scenario not shown) the ring can no longer get some loose from the attachment rod, regardless of the position of the attachment, for example in the case of crimping performed on the ceiling, the ring would tend to fall due to the action of gravity, and the arm 281a can return to the first position or any other position allowing the crimping nose 32 to perform the crimping operation on the ring.

The base plate also includes a stop device (not shown in the figures), similar to the device 28a for holding the rings in position when said rings are being installed by the second subassembly 21b.

The advantages of the invention will become apparent from the description of the best embodiment of the device 5, description which clearly specifies the role of each element that makes up said device.

A prior step for using the device 5 consists of inserting, or generating, in the monitoring and control system 54 a database containing the spatial positions of the various attachments to be installed and of defining the order in which the attachments 1 are to be installed. This step is known in systems that use robots. Currently, it mostly involves the use of computer-aided design techniques capable of calculating the theoretical position of each attachment 1 in a frame of reference as well as the spatial orientation of the axis 10 of the attachment.

For the needs of this device 5, the database containing the spatial positions of the various attachments 1 to be installed also includes, for each attachment, information characterising the direction and distance of the structural obstacle nearest to the attachment.

For example, such a structural obstacle can be the core of an L-shaped stiffener to be fixed to a panel by means of a line of attachments between the base plate of the stiffener and the panel.

Using the database of attachments to be installed, the robot 51 controlled by the monitoring and control means 54 prepositions, in position and orientation, the end 52 of the carrying arm, in other words, placing said end of the carrying arm in a theoretical position in which the crimping nose 32 of the end tool 53 is located according to the axis 10 of the theoretical position of the attachment 1 to be installed, in other words, than an axis 321 of the crimping nose is substantially aligned with the axis 10 of the attachment. During this prepositioning operation, the supporting base plate 33 is brought into contact with the surface of the elements to be assembled located on the side of said elements on which the ring 15 will be installed.

This prepositioning is performed with the positioning precision corresponding to the capabilities of said robot and considering that the fine-positioning device 4 is in an intermediate position, for example a median position, according to the three directions X, Y and Z for adjusting said device.

Once the prepositioning is performed, or else during the prepositioning movement, the fine-positioning device 4 is offset according to the directions X and Y in a direction opposite to that of the nearest structural obstacle as defined in the database for the attachment in question and by a distance corresponding to the distance between the axis 321 of the crimping nose 32 and the axis 241a or 241b of the openings 24a and 24b respectively of the ring insertion subassemblies 21a, 21b. At the end of this phase, one of the openings 24a or 24b according to the position of the structural obstacle is theoretically located in line with the opening of the fork of the supporting base plate 33 on the same axis 10 as an attachment to be installed and the crimping nose 32, on the other hand, is offset in a direction opposite to the direction in which the structural obstacle is located.

In practice, due to inaccuracies in positioning the robot 51 and inaccuracies in positioning the attachment holes due to dispersion in the production and positioning of the parts to be assembled, the opening 24a or 24b is not located exactly on the axis of the attachment to be installed.

The camera, 27a or 27b depending on each case, generates an image of the hole of the attachment, offset in relation to the axis 241a of the opening 24a, or on the axis 241b of the opening 24b, which is then analysed by signal processing means, for example in the automaton 54 which in this case receives the images produced by the cameras 27a, 27b, to generate a signal to control the motors with movements of the fine-positioning means 4 according to X and Y in order, by means of a repositioning operation, to place the centre of the image of the hole of the attachment substantially in line with the axis 241a of the opening 24a or the axis 241b of the opening 24b.

The fine-positioning device 4 and the capacitors of the image generation and processing means are manufactured so as to meet the precision requirements of this repositioning operation. In the case of mechanical assembly with attachments similar to the described attachments, a precision of 0.1 mm is generally enough, precision which can be achieved with no particular difficulty using known devices.

Advantageously, at this stage of the operations of installing an attachment, the rod 11 of said attachment is not yet inserted in the hole in order to obtain as clear a picture as possible of the hole of the attachment, a desirable condition to ensure the precision of the repositioning operation.

Once the repositioning operation has been performed, the rod 11 of the attachment is introduced in a conventional manner in the attachment hole by the surface of the assembly opposite the surface of the side on which the end tool 53 is located. This operation can be performed by any known means, advantageously by a robot slaved in position to the device 5.

A crimping ring 15, supplied via the channel 22a as shown in FIG. 5b, or by the channel 22b, pushed for example by blowing with compressed air, is inserted naturally around the rod 11 of the attachment, which at that time is located on the axis of the opening 24a or 24b through which said crimping ring is pushed.

The stop device is then placed in the second position or blocking position in which the ring is held in place on the rod regardless of the orientation of said rod.

The device advantageously performs a test to check whether the ring is actually positioned around the rod of the attachment. This test is preferably performed by processing the image from the camera used for the repositioning step, but other means can also be used, such as, for example, a sensor with or without contact to detect the presence of the ring.

When the crimping ring 15 is installed and held in place on the rod 11 of the attachment, without any controlled movement of the robot 51, the fine-positioning device 4 is controlled in order to move the axis 321 of the crimping nose 32 onto the axis 10 of the attachment, movement during which the ring insertion subassembly 21a or 21b is offset from the axis of the attachment, in other words, by a distance corresponding to the distance between the axis 321 of the crimping nose 32 and the axis 241a or 241b of the opening 24a or 24b respectively, which was initially repositioned to be substantially in line with the axis 10 of the attachment.

Finally, the fine-positioning device 4 is actuated in the direction Z to move the crimping nose towards the rod 11 of the attachment so that an extension 18 of the rod 11 used to exert a pull on said rod is inserted in the crimping nose and the ring crimping device 3 is activated.

Once the crimping operation is completed, the extension 18, generally broken during the crimping operation, is removed by means not shown, and the robot 51 releases the end tool 53 from the surface of the assembled element and then restarts the cycle for the next attachment according to the installation sequence defined in the automaton 54.

In an alternative embodiment of the invention, the end tool 53 only includes one ring 15 insertion subassembly 21a, the end tool 53 in this case being identical to that in the described example but without the second subassembly 21b.

To implement a device 5 comprising such an end tool 53 with a single subassembly 21a, the robot is used to guide the end tool 53 around an axis parallel to the Z axis so as to avoid interference with nearby structures of the attachment bearing in mind the direction of the movement of the fine-positioning device 4 imposed by using a single ring insertion subassembly.

In this way, it is possible rapidly to install and crimp attachments with the desired quality using crimped rings, with minimal human intervention during the crimping process, using medium-precision robots 51 thanks to an accurate repositioning device 4 associated with an end tool 53 comprising a automatic ring installation device 2 and a crimping device 3.

The invention claimed is:

1. A device for inserting and crimping a ring on a rod of an attachment, accordingly to a longitudinal axis Z, placed in a hole, comprising:
    a robot having an end element;
    a monitoring and control system; and
    an end tool capable of crimping the ring on the rod, said end tool including a crimping device comprising a crimping nose and a ring insertion device for installing the ring, wherein the end tool comprises a fine-positioning device to move accurately relative to the end element of the robot according to the longitudinal axis Z and to an axis X substantially perpendicular to axis Z and to an axis Y substantially perpendicular to the axis X and to the axis Z, by means of which fine-positioning device of the end tool is fixed to the end element of the robot, and wherein a base plate is connected to the end element of the robot, wherein the fine-positioning device is operable to move relative to the end element of the robot, when prepositioned, according to the X and/or Y axis, in order to position the ring insertion device, or alternatively to position the crimping nose of the crimping device on an axis of an attachment to be installed, wherein the relative position between an axis of an outlet of a ring transport channel of the ring insertion device and an axis of the crimping nose, said axes being substantially parallel to an axis of the attachment when the end tool is in position to install and crimp a ring, is substantially constant, and wherein the fine-positioning device includes a motorized translation table with the three axes X, Y and Z substantially perpendicular to one another, at least one axis, the Z axis, being position substantially parallel to the axis of the crimping nose.

2. The device according to claim 1, comprising a system for repositioning the ring insertion device to bring the value of a deviation measured between a position of the hole and the axis of the outlet of the ring transport channel under a threshold value.

3. The device according to claim 2, wherein the repositioning system of the ring insertion device reduces the deviation measured by commands received by actuators causing the fine-positioning device to move according to a direction of axis X and/or axis Y.

4. The device according to claim 2, comprising at least one camera arranged to measure the deviation between the position of the hole and the axis of the outlet of the ring transport channel.

5. The device according to claim 4, wherein said at least one camera is arranged so that the hole for the attachment to be installed is observed by said at least one camera in line with the axis of the outlet of the ring transport channel.

6. The device according to claim 1, wherein the ring insertion device comprises two ring insertion subassemblies arranged substantially symmetrically in relation to the crimping nose.

7. The device according to claim 1 comprising at least one stop which in turn comprises at least one position in which a ring is held on a rod of the attachment when the ring insertion device is removed from the ring insertion position.

8. The device according to claim 1, wherein the monitoring and control system comprises a database containing the position and orientation in a frame of reference of attachments to be installed and, for each attachment, information characterizing a direction and a distance of a closest structural obstacle to the attachment.

* * * * *